United States Patent [19]
Pyatt et al.

[11] Patent Number: 4,807,248
[45] Date of Patent: Feb. 21, 1989

[54] AUTOMATIC RESYNCHRONIZATION TECHNIQUE

[75] Inventors: Roger A. Pyatt; Ivan E. Hardt, both of Cedar Rapids; Cynthia A. Bonebright, Marion, all of Iowa

[73] Assignee: Rockwell International Corporation, El Segundo, Calif.

[21] Appl. No.: 613,659

[22] Filed: May 23, 1984

[51] Int. Cl.⁴ .......................... H01K 1/00; H04L 9/00
[52] U.S. Cl. .......................................... 375/1; 375/114
[58] Field of Search ................. 375/110, 114, 115, 1; 370/100, 105, 104, 106

[56] References Cited

U.S. PATENT DOCUMENTS

| | | | |
|---|---|---|---|
| 3,591,720 | 7/1971 | Othmer | 370/106 |
| 3,603,735 | 9/1971 | Cleobury | 370/106 |
| 3,662,114 | 5/1972 | Clark | 370/106 |
| 3,742,145 | 6/1973 | Clark et al. | 370/106 |
| 4,022,973 | 5/1977 | Stackhouse et al. | 375/114 |
| 4,066,964 | 11/1978 | Costanza et al. | 375/1 |
| 4,280,222 | 7/1981 | Flower | 375/115 |
| 4,359,770 | 11/1982 | Suzuka | 370/100 |
| 4,567,588 | 1/1986 | Jerrim | 375/1 |
| 4,571,722 | 2/1986 | Bingham et al. | 370/106 |
| 4,583,221 | 4/1986 | Uchida et al. | 370/106 |
| 4,621,365 | 11/1986 | Chiv | 375/1 |
| 4,677,617 | 6/1987 | O'Connor et al. | 375/1 |
| 4,679,207 | 7/1987 | Tsuda | 375/1 |

Primary Examiner—Salvatore Cangialosi
Attorney, Agent, or Firm—George A. Montayne; Gregory G. Williams; H. Frederick Hamann

[57] ABSTRACT

There is disclosed a technique for providing resynchronization for message reception in digital transmission systems, and particularly in digital frequency hopping systems employing data framing techniques. In the transmission of framed data using known digital techniques for frequency hopping systems, synchronization is provided in frames preceding the message frames transmitting digital data. In addition, resynchronization information is transmitted in subsequent frames which are interspersed with data frames including the message data. A predetermined number of frames is set to provide all the resynchronization information so that once those frames have been detected, a receiver will have acquired resynchronization during message transmission. This technique allows improved signal acquisition by providing an opportunity following the first conventional synchronization frame to acquire synchronization or to reacquire synchronization during message transmission.

2 Claims, 1 Drawing Sheet

AUTOMATIC RESYNCHRONIZATION TECHNIQUE

This application is related to application Ser. No. 613,664, entitled "Multiple Synchronization Technique for Packetized Data Transmission" by Duane L. Abbey filed on even date herewith and assigned to the same assignee as the present invention. This application is also related to application Ser. No. 613,665 entitled "Digital Communications Software Control System" by Ivan E. Hardt et al, filed on even date herewith and assigned to the same assignee as the present invention.

BACKGROUND OF THE INVENTION

The present invention relates to techniques for providing the transmission and reception of information and, more particularly, to digital transmission and receiving systems for communicating digitized voice or data information.

With recent advances in the communications art, there has been a trend to provide communication of information between transmitting and receiving systems of both voice and data information using digital techniques. In such systems, voice or data information is first digitized and then transmitted in a digital format to a receiver where it is then demodulated and decoded to convert the digital information to the original voice or data information. In systems operating at a predetermined carrier frequency, reception of such digitized information is not a problem since a receiver may tune to the carrier frequency, and thereafter receive and demodulate the transmitted digital information. In such systems, there is no need to synchronize the transmitter and receiver since the carrier is fixed and the data is being transmitted over the known carrier.

In communication systems which do not utilize a fixed frequency for data transmission, such as a frequency hopping system, where the frequency of transmission changes in a pseudorandom fashion, there is a need for synchronization between the transmitter of the digital data and the user or receiver receiving that digital data. In conventional frequency hopping systems, such synchronization has been typically accomplished by transmitting a time reference on a fixed frequency so the receiver can synchronize its internal clock with the internal time clock of the transmitter and thereafter receive data, including a synchronization preamble, which contains information sufficient to allow the receiver to synchronize to the frequency hopping pattern of the transmitter. This synchronization preamble has typically been provided only once in a message transmission, at the beginning of a message, so that synchronization must be achieved at that time or the message will be lost.

In accordance with the above technique, various problems have been encountered during the transmission and reception of information. In particular, if a receiving station is transmitting during the time that another transmitting station begins to transmit its information, the synchronization preamble from the other transmitting station will not be detected by the receiving station and will be lost. Thus, the receiving station will be unable to receive and decode the message unless the other transmitting station transmits the same message again. Likewise, if a signal is being received by a receiving station and that transmitted signal fades or is lost for some other reason due to interference (or otherwise) during message transmission, the receiver has no ability to reacquire synchronization without the transmitter reinitiating the same message transmission at another time. Each of the above are operational effects which limit the efficient use of any communication system and decrease reliability where synchronization is important.

Accordingly, the present invention has been developed to overcome the specific shortcomings of the above known and similar techniques and to provide an improved data transmission which enables improved synchronization and message transmission in frequency hopping systems.

SUMMARY OF THE INVENTION

In accordance with the present invention, there is disclosed a multiple synchronization technique for data transmision which is applicable to frequency hopping systems and any other systems utilizing framed data transmission. The technique employs data framing wherein message and synchronization data are transmitted during frame periods. At the beginning of a message transmission, information is transmitted in synchronization frames which allow the receiver to obtain synchronization with the transmitter. Thereafter, data frames are transmitted which contain discrete blocks of digital data defining the message to be transmitted. During the course of the data transmission, a frame of resynchronization information is inserted after a predetermined number of message frames and upon the receipt of a predetermined number of such resynchronization frames, the receiver can obtain resynchronization with the transmitter or initial synchronization if the receiver failed to acquire synchronization at the beginning of the message. This resynchronization can be achieved without a substantial effect upon the bandwidth or transmission characteristics of the digital system since it merely utilizes resynchronization frames interspersed with message frames and operating in accordance with the conventional bandwidth requirements of the system.

It is therefore a feature of the invention to provide a data synchronization technique which provides improved data transmission characteristics.

It is a further feature of the invention to provide a data synchronization technique for use with framed data in a frequency hopping system which enables resynchronization upon a failure to acquire initial synchronization.

Still another feature of the invention is to provide a digital transmission technique employing a data format which incorporates a predetermined number of frames of resynchronization information interspersed with message frames to allow synchronization or resynchronization of a receiver.

Still a further feature of the invention is to provide a resynchronization technique which allows a receiver to obtain synchronization with a transmitter upon loss of the transmitted signal by fading or other effects.

Yet another feature of the invention is to provide a technique for enabling resynchronization following the transmission of a predetermined number of message frames interspersed with resynchronization frames in a digital communication system.

These and other objects, advantages and novel features of the invention will become apparent from the following detailed description when considered with the accompanying drawings wherein:

DETAILED DESCRIPTION OF A PREFERRED EMBODIMENT

Figure 1:
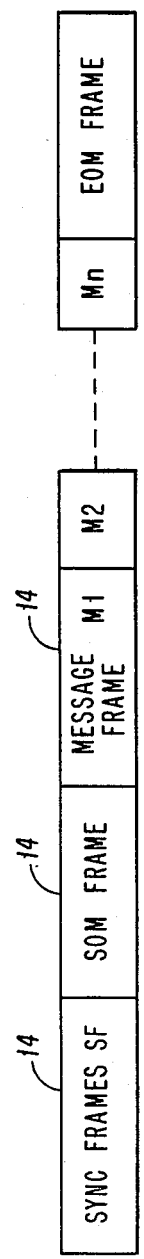
FIG. 1 is a schematic diagram of a prior art example of a format for a framed message transmission in a frequency hopping system.

Referring now to the drawings wherein like numerals refer to like elements throughout, there is shown in FIG. 1 a schematic diagram of the data format used to transmit digital data in a conventional communication system. While the present example will be described with respect to a frequency hopping system, it is apparent that the same data formatting techniques are applicable in any communication system which may employ data framing techniques and require synchronization information for transmission of the message represented by the data. The same is applicable to both voice and data transmission in digital systems and is thus not restricted to one or the other.

As was previously noted, in normal communication systems including data framing techniques, the system is operated so that a transmitting station transmits data in frames represented by blocks 14 in FIG. 1. In such conventional systems, the transmitting and receiving stations may be part of a network in which all individual users of that network have the capability of both transmitting and receiving information. Accordingly, all of the users will be capable of transmitting the information in the same format and receiving that same information knowing the format of the transmitted information.

As is known, in frequency hopping systems, all the users of the network must have a synchronized internal time clock with respect to a reference such that message synchronization can be acquired with a given transmitter at any given time using the known format. Known techniques for acquiring synchronization in such frequency hopping systems are used to detect information in a synchronization frame so that the receiver can thereafter frequency hop with the transmitter to receive the data. The information necessary to frequency hop with the transmitter is initially entered and conventionally stored in the receiver and used once message synchronization has been attained.

Again, in prior art systems, involving the transmission of a message, the digital data is usually transmitted in a format which includes a plurality of synchronization frames at the beginning of a message which is followed by a start-of-message frame, which is in turn followed by a plurality of message frames including the digital data forming the message. In a typical frequency hopping system, each frame of data will be transmitted on a different one of the frequencies of the frequency hopping system as those frequencies are changed. In accordance with FIG. 1, the sync frames (SF) and start-of-message (SOM) frame precede the message frames M1-Mn. Likewise, the last message frame Mn is followed by an end-of-message (EOM) frame which identifies the end of the message transmission. The receiver is therefore notified that the message has been transmitted and can reply to the message, or initiate its own transmission for other purposes. As will be appreciated, the above format is acceptable when the time synchronization between the internal clocks of the users of a network is very accurate, and where synchronization is achieved at the beginning of the message.

However, in those instances where a user fails to detect the synchronization frames at the beginning of the message, that user is unable to synchronize with the transmitter to obtain the message during the remainder of the course of message transmission. Therefore, the user must wait until the end of the message and either require the message to be retransmitted or wait for the message to be transmitted again. Likewise, even if the user acquires synchronization with the transmitter at the beginning of the message, any fading of the transmitted signal resulting in a loss of synchronization by the receiver, will cause the receiver to lose the remainder of the message since synchronization can only be achieved at the beginning of the message. Accordingly, in low signal-to-noise environments or other interfering environments involving fading or signal interference, there is a high degree of probability that a message transmission will be lost without the ability to acquire resynchronization. As will be appreciated, much time and data can be lost in attempting to retransmit or obtain resynchronization to acquire the message.

In accordance with the technique disclosed in the aforementioned co-pending application of assignee, which is herein incorporated by reference in its entirety, there is disclosed a data format technique which involves multiple synchronization and resynchronization. In accordance with that technique, complete synchronization information is generated a plurality of times within each message frame, thereby allowing synchronization and message acquisition a plurality of times during each transmission of the message. While the disclosed technique enables the successful synchronization and resynchronization of the receiver, there are instances where it may not be desirable to transmit all of the information necessary to acquire resynchronization during successive time periods. Accordingly, the present invention discloses a technique which allows initial synchronization and resynchronization without transmitting complete synchronization information in successive time periods.

The present technique includes a data format for maintaining communications between multiple users where synchronization is critical. Such a technique is highly useful in frequency hopping systems and enables such systems to acquire synchronization and resynchronization at other than the beginning of the message transmission. This is accomplished without the need for increased bandwidth requirements of the system, and without a substantial degrading of the characteristics of the system. Furthermore, the technique prevents the loss of a significant amount of data during the course of a transmission due to loss of signal and loss of synchronization.

Figure 2:
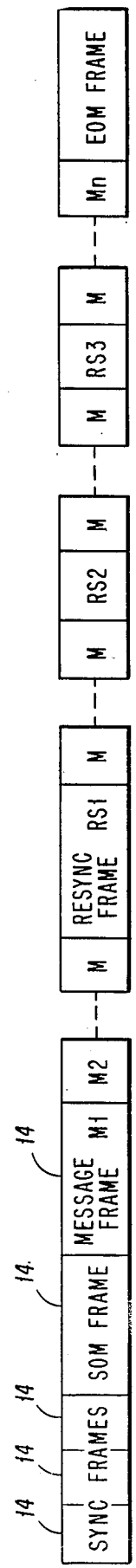
FIG. 2 is a schematic diagram showing an exemplary message transmission data format including a plurality of frames interspersing synchronization frames and message frames to allow synchronization and resynchronization.

Referring now to FIG. 2, there is shown the data format technique used in accordance with the present invention. As was the case in the prior art, the beginning of the message is initiated with synchronization frames defining a synchronization preamble which allows the receiver to synchronize with the transmitter. The synchronization preamble includes three identical sync frames transmitted on different frequencies followed by a start-of-message frame which identifies the beginning of the message to that receiver or any user of the system. Thereafter, the message frames M1-Mn are transmitted which contain the digital message for communication to the users. Upon detection of one of the sync frames and the SOM frame (two out of the four frames in the preamble), the user acquires synchronization and can receive the incoming message.

In contrast to prior art techniques, however, resynchronization frames RS1-RSn are interspersed with the data frames M1-Mn at predetermined periods in order to allow resynchronization during the course of message transmission. Specifically, the resynchronization frames RS1-RSn can be interspersed at regular intervals so that resynchronization can be acquired after a predetermined number of resynchronization frames have been transmitted. In the present example, there are four resynchronization frames comprising the the particular example of the present embodiment, one resynchronization frame is inserted in the data transmission for every twenty-four data frames that have been transmitted. Thereafter, at least two of the four resynchronization frames must be detected in order to obtain resynchronization (one synchronization frame and the SOM frame). Thus, four resynchronization frames contain the same synchronization information as the synchronization frames transmitted at the beginning of the message transmission. The resynchronization frames are interspersed with the data frames such that one resynchronization frame occurs after each 24 message frame period throughout the total length of the message.

In accordance with the above, initial synchronization can be obtained using the synchronization frames 14 and SOM frame transmitted at the beginning of the message. Thereafter, if synchronization is lost, the same synchroniza-tion information can be obtained by sensing the resynchronization frames over the period which includes a minimum of four resynchronization frames. Following the receipt of at least two of those four resynchronization frames (one sync frame and the SOM frame), the receiver will be able to attain resynchronization with the transmitter. Accordingly, rather than a complete loss of the entire message, the receiver will be able to attain resynchronization and at least a partial reception of the remainder of the message.

The above technique also allows resynchronization upon fading of the transmitted signal for the same reasons as discussed above. Specifically, if initial synchronization is obtained using the synchronization frames at the beginning of the message, but that synchronization is lost due to signal fading during transmission, the same plurality of resynchronization frames following fading can be used to reacquire synchronization. Thus, the transmission can again be acquired without complete loss of the message following a loss of signal due to fading. The same technique will be applicable to obtaining resynchronization due to loss of synchronization for any other reason which would prevent initial acquisition or produce loss of synchronization during message transmission.

While the present invention has been described with specific reference to the transmission of a predetermined number of resynchronization frames interspersed with a predetermined number of message frames, the actual number of message frames and resynchronization frames used can be varied depending upon the requirements of the system. Thus, while 24 message frames are transmitted prior to the transmission of a resynchronization frame, and at least two of the four resynchronization frames are required before resynchronization can be achieved by the receiver, other numbers could be used to produce the same results if desired. Accordingly, the system can be easily modified to accommodate variations and limitations on the characteristics of the system which might impose a restriction on the number of message frames transmitted and the number of resynchronization frames needed to acquire resynchronization or initial synchronization.

As will be apparent from the above description, the present invention provides a technique which improves the probability of signal acquisition and message reception in a digital transmission system. More specifically, the system enables the acquisition of synchronization during a time period after the transmission of a message has begun and allows for reacquisition of synchronization during the transmission of that message. The particular technique is also applicable to checking the synchronization of receiver that has not lost synchronization, merely by sensing the same resynchronization frames that are present in the message transmission. The system enables synchronization and resynchronization in situations where the initial synchronization data is not detected or the message transmission is lost following initial synchronization. All of these are features which are not shown or suggested by any of the prior art.

Obviously, many other modifications and variations of the invention are possible in light of the above teachings. It is therefore to be understood that within the scope of the appended claims, the invention may be practiced otherwise than as specifically described.

What is claimed is:

1. A data transmission technique comprising: (a) providing a transmitter capable of transmitting information in a series of different and pseudoramdomly selected frequencies; (b) providing a receiver capable of receiving information in a series of different and pseudoramdomly selected frequencies; (c) generating a plurality of synchronization frames and resynchronization frames, for allowing the receiver to frequency synchronize with the transmitter, wherein the information necessary to acquire synchronization is divided among at least two of said synchronization or resynchronization frames with each frame transmitted on a different frequency, said at least two synchronization or resynchronization frames comprising a plurality of identically formatted and timed synchronization frames and a start of message frame; (d) generating a plurality of message frames including information defining a message to be transmitted and (e) transmitting said plurality of identically formatted and timed synchronization frames and said start of message frames such that said plurality of identically formatted and timed synchronization frames are transmitted prior to the transmission of said start of message frame, each frame is transmitted on a different pseudoramdomly selected frequency and said plurality of resynchronization frames are separated by message frames.

2. A data transmission technique in a frequency hopping system comprising: (a) providing a transmitter capable of transmission of information in a series of different and pseudoramdom frequency, so that, the frequency of transmission can be varied in order to prevent reception of the entire transmission by unauthorized receivers; (b) providing a receiver capable of receiving information in a series of different pseudoramdom frequencies, so that, the frequency of reception can be varied in order to allow for the reception of transmissions in a series of different pseudoramdom frequencies; (c) generating a plurality of synchronization frames and resynchronization frames for allowing the receiver to synchronize with the transmitter, wherein the information necessary to acquire synchronization is divided among at least two of said synchronization or resynchronization frames, said at least two synchronization or resynchronization frames comprising a plurality of identically formatted and timed synchronization frames in a start of message frames; (d) generating a plurality of message frames including information defining a message to be transmitted; and (e) transmitting said plurality of identically formatted and timed synchronization frames and said start of message frame such that said plurality of identically formatted and timed synchronization frames that are transmitted prior to the transmission of said start of message frame and such that said plurality of resynchronization frames are separated by message frames; whereby, in the event that synchronization between a transmitter and a receiver is lost during the course of a transmission, resynchronization can be obtained during that same transmission and thereby minimizing the loss of any information available to the receiver.

* * * * *